(12) United States Patent
Lee

(10) Patent No.: US 8,055,363 B2
(45) Date of Patent: Nov. 8, 2011

(54) MULTIMEDIA OUTPUT APPARATUS AND MULTIMEDIA SYSTEM COMPRISING THE SAME

(75) Inventor: Chang-jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1706 days.

(21) Appl. No.: 11/174,482

(22) Filed: Jul. 6, 2005

(65) Prior Publication Data

US 2006/0050657 A1    Mar. 9, 2006

(30) Foreign Application Priority Data

Sep. 8, 2004   (KR) .................. 10-2004-0071808

(51) Int. Cl.
*G06F 17/00* (2006.01)
*H02B 1/00* (2006.01)
*H04N 7/00* (2011.01)
*H04N 5/268* (2006.01)

(52) U.S. Cl. ........... 700/94; 381/123; 348/465; 348/705
(58) Field of Classification Search .................... 700/94; 381/123; 348/14.11, 14.12, 14.13, 462, 465, 348/481, 483, 485, 705; 369/2; 725/143, 725/144, 146
See application file for complete search history.

(56) References Cited

U.S. PATENT DOCUMENTS 6,052,471 A * 4/2000 Van Ryzin ............. 381/85
6,914,637 B1 * 7/2005 Wolf et al. ............. 348/473
2002/0049879 A1 * 4/2002 Eyer ...................... 710/305
2003/0126623 A1 * 7/2003 Hara et al. ............. 725/153
2003/0219227 A1   11/2003 Otala et al.
2004/0128402 A1 * 7/2004 Weaver et al. ......... 710/1
2005/0008323 A1 * 1/2005 Han ........................ 386/37
2005/0063418 A1 * 3/2005 Case ...................... 370/466

FOREIGN PATENT DOCUMENTS

KR          2004-20150         3/2004

* cited by examiner

*Primary Examiner* — Davetta W Goins
*Assistant Examiner* — Daniel Sellers
(74) *Attorney, Agent, or Firm* — Stanzione & Kim, LLP

(57) ABSTRACT

A multimedia output apparatus includes an audio port to receive a first audio signal, a connection port to receive a first video signal or both a second video signal and a second audio signal, a sensor to sense whether the connection port receives only the first video signal or both the second video signal and the second audio signal, a switch to select one of the second audio signal received through the connection port and the first audio signal received through the audio port to be output, and a controller to control the switch to output the first audio signal received through the audio port when the sensor senses that only the first video signal is received through the connection port and to output the second audio signal received through the connection port when the sensor senses that both the second video signal and the second audio signal are received through the connection port. Thus, the multimedia output apparatus and a multimedia system comprising the same is capable of receiving a video signal and an audio signal from both a first multimedia source that transmits a video signal and an audio signal individually through individual interfaces and a second multimedia source that transmits the video signal and the audio signal in a combination through the same interface. The multimedia output apparatus is further capable of transitioning between the two multimedia sources.

17 Claims, 4 Drawing Sheets

MULTIMEDIA OUTPUT APPARATUS AND MULTIMEDIA SYSTEM COMPRISING THE SAME

CROSS-REFERENCE TO RELATED APPLICATIONS

This application claims the benefit of Korean Patent Application No. 2004-71808, filed on Sep. 8, 2004, in the Korean Intellectual Property Office, the disclosure of which is incorporated herein in its entirety by reference.

BACKGROUND OF THE INVENTION

1. Field of the Invention

The present general inventive concept relates to a multimedia output apparatus and a multimedia system comprising the same, and more particularly, to a multimedia output apparatus comprising an interface that is capable of receiving a video signal and an audio signal from both a first multimedia source that transmits a video signal and an audio signal individually through individual interfaces and a second multimedia source that transmits the video signal and the audio signal in a combination through the same interface.

2. Description of the Related Art

A multimedia system comprises a multimedia source, such as a digital video disc (DVD) player, a digital broadcast receiver (e.g., set-top box), or the like, to transmit a multimedia signal, and a multimedia output apparatus, such as a television (TV) or the like, to output the multimedia signal received from the multimedia source.

An interface is typically provided between the multimedia source and the multimedia output apparatus to enable data to be transmitted and/or received therebetween. Recently, a digital visual interface (DVI), a high definition multimedia interface (HDMI), etc., has been used as the interface.

Here, the DVI and the HDMI are compatible with each other through a conversion cable, so that it is possible to connect a multimedia source having the DVI with the multimedia output apparatus having the HDMI.

FIGS. 1 and 2 are block diagrams illustrating a conventional multimedia output apparatus having an HDMI port to which a multimedia source having the HDMI (hereinafter, referred to as the "HDMI source") and a multimedia source having the DVI (hereinafter, referred to as the "DVI source") are connected through cables, respectively.

As illustrated in FIG. 1, when an HDMI source 100 is connected to an HDMI port 112 through an HDMI cable 102, a transition minimized differential signaling (TMDS) signal is transmitted from the HDMI source 100 to a multimedia output apparatus 110 through the HDMI port 112. Here, the TMDS signal transmitted from the HDMI source 100 contains both a video signal and an audio signal.

The TMDS signal is input to an HDMI integrated chip (IC) 114 used as a decoder. The HDMI IC then divides the TMDS signal into the video signal and the audio signal. The video signal and the audio signal are then input to and processed by a video processor 116 and an audio processor 118, respectively.

On the other hand, as shown in FIG. 2, when a DVI source 200 is connected to the HDMI port 112 through a DVI-HDMI cable 202, the TMDS signal is transmitted from the DVI source 200 to the multimedia output apparatus 110 through the HDMI port 112. Here, the DVI is an interface capable of only transmitting the video signal without the audio signal; therefore the TMDS signal transmitted from the DVI source 200 only contains the video signal. As a result, when the TMDS signal transmitted from the DVI source 200 to the HDMI port 112 is input to and decoded by the HDMI IC 114, only the video signal is output.

That is, when a user connects the HDMI source 100 to the HDMI port 112 of the multimedia output apparatus 110 as illustrated in FIG. 1, both the video signal and the audio signal are output. However, when the user connects the DVI source 200 to the HDMI port 112 of the multimedia output apparatus 110 as illustrated in FIG. 2, there arises a problem that only the video signal is output.

SUMMARY OF THE INVENTION

The present general inventive concept provides a multimedia output apparatus and a multimedia system comprising an interface that is capable of receiving a video signal and an audio signal from both a first multimedia source that transmits a video signal and an audio signal individually through individual interfaces and a second multimedia source that transmits the video signal and the audio signal in a combination through the same interface. The multimedia output apparatus is capable of transitioning between the first multimedia source and the second multimedia source.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a multimedia output apparatus comprising an audio port to receive an audio signal, a connection port to receive a video signal or both the video signal and the audio signal, a sensor to sense whether the connection port receives only the video signal or both the video signal and the audio signal, a switch to select one of the audio signal received through the connection port and the audio signal received through the audio port to be output, and a controller to control the switch to output the audio signal received through the audio port when the sensor senses that only the video signal is received through the connection port and to output the audio signal received through the connection port when the sensor senses that both the video signal and the audio signal are received through the connection port.

The connection port may comprise an HDMI port.

The foregoing and/or other aspects and advantages of the present general inventive concept may also be achieved by providing a multimedia system comprising a first multimedia source having a first interface to transmit an audio signal and a video signal; a second multimedia source having a second interface to transmit the video signal and a third interface to transmit the audio signal; and a multimedia output apparatus comprising a connection port to which one of the first and second interfaces is connectable, an audio port to which the third interface is connectable, a switch to select one of the audio signal received through the connection port and the audio signal received through the audio port to be output, a source sensor to sense whether the first multimedia source or the second multimedia source is connected to the connection port, and a controller to control the switch to output the audio signal received through the connection port when the source sensor senses that the first multimedia source is connected to the connection port, and to output the audio signal received through the audio port when the sensor senses that the second multimedia source is connected to the connection port.

The first interface may comprise an HDMI interface, and the second interface may comprise a DVI interface.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
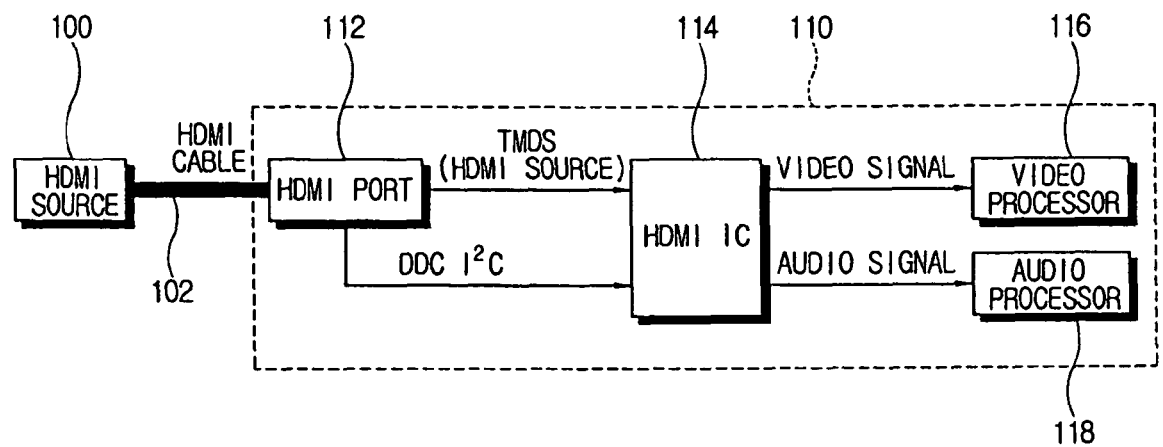
FIG. 1 is a block diagram illustrating a conventional multimedia output apparatus having a high definition multimedia interface (HDMI) port to which a multimedia source having an HDMI is connected.
Figure 2:
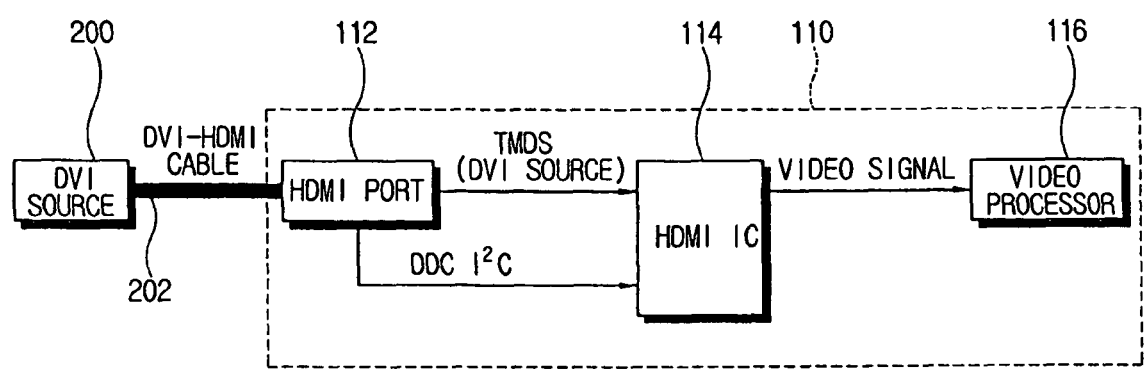
FIG. 2 is a block diagram illustrating the conventional multimedia output apparatus of FIG. 1 having the HDMI port to which a multimedia source having a DVI is connected.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 3:
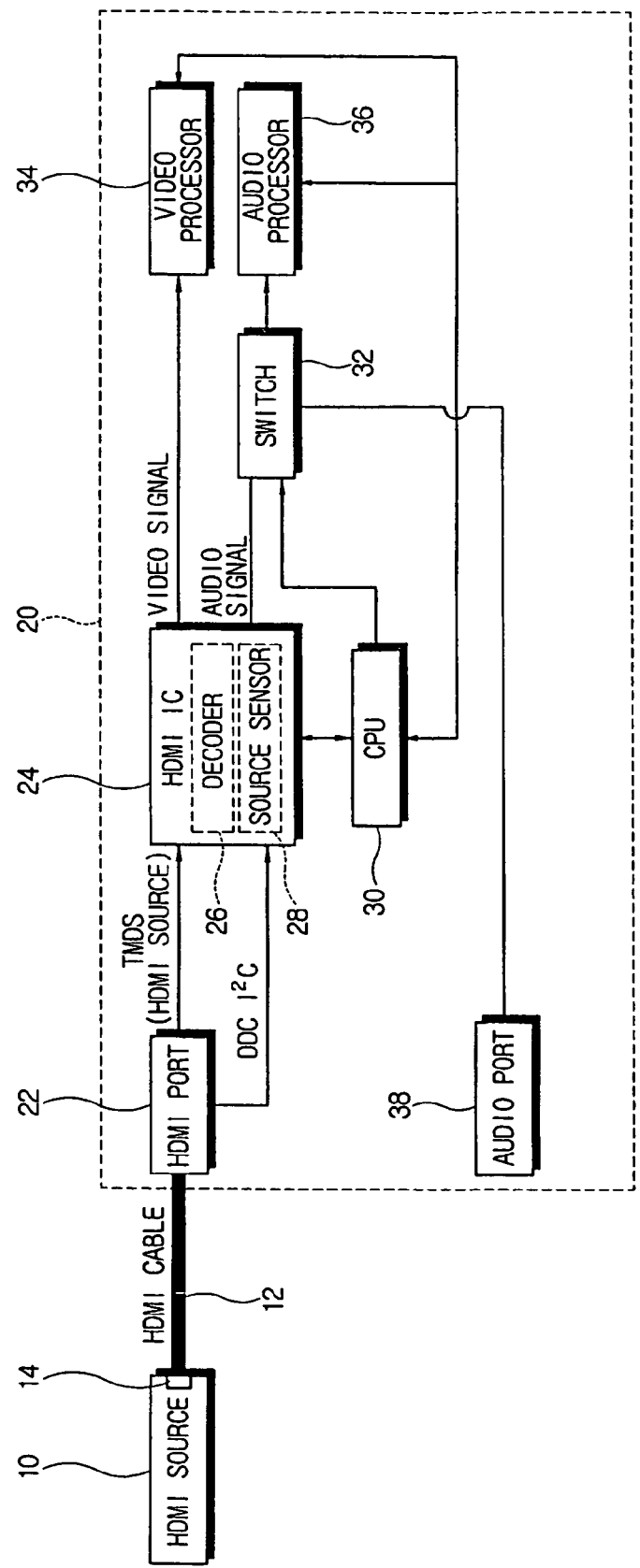
FIG. 3 is a block diagram illustrating a multimedia output apparatus according to an embodiment of the present general inventive concept, to which a multimedia source having an HDMI is connected.
Figure 4:
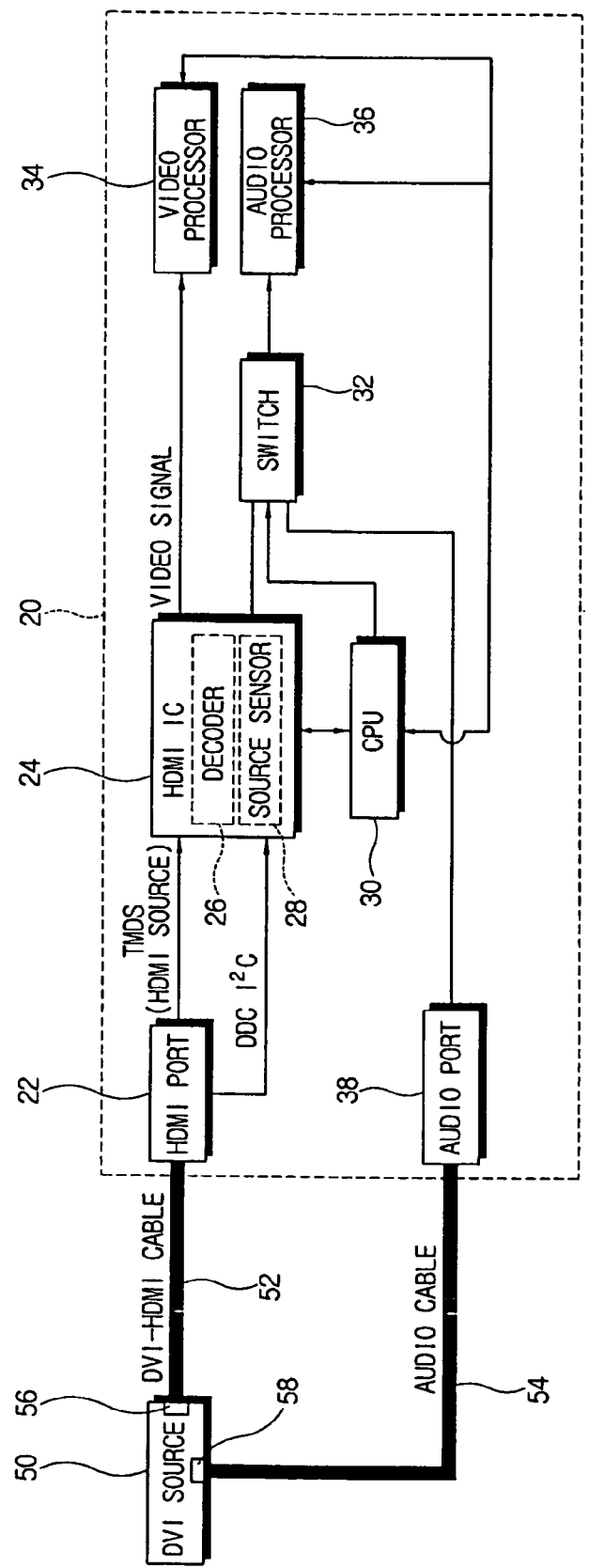
FIG. 4 is a block diagram illustrating the multimedia output apparatus of FIG. 3, to which a multimedia source having a DVI is connected.

FIGS. 3 and 4 are block diagrams illustrating a multimedia output apparatus 20 according to an embodiment of the present general inventive concept, to which an HDMI source and a DVI source are connected through cables, respectively.

An HDMI source 10 and a DVI source 50 may include a DVD player, a digital broadcast receiver (e.g., a set-top box), or the like, to transmit a multimedia signal.

The HDMI source 10 comprises an HDMI 14 to output an audio signal and a video signal. The HDMI source 10 outputs the audio signal and the video signal to an HDMI cable 12. The DVI source 50 comprises a DVI 56 to output the video signal, and an audio interface 58 to output the audio signal. The DVI source outputs the video signal to a DVI-HDMI cable and the audio signal to an audio cable.

As illustrated in FIGS. 3 and 4, the multimedia output apparatus 20 according to an embodiment of the present general inventive concept comprises an HDMI port 22, an audio port 38, an HDMI IC 24 having a decoder 26 and a source sensor 28, a video processor 34 to process the video signal, an audio processor 36 to process the audio signal, a switch 32 to select either the audio signal from the HDMI IC 24 or the audio signal from the audio port 38 to be input to the audio processor 36, and a central processing unit (CPU) 30 to control the multimedia output apparatus 20.

The HDMI port 22 receives a TMDS signal from the HDMI source 10, the DVI source 50, or the like. The HDMI port 22 may be connected to either the HDMI 14 of the HDMI source 10 or the DVI 56 of the DVI source 50 through a cable. Thus, the HDMI port 22 receives the TMDS signal containing both the video signal and the audio signal output from the HDMI source 10 through the HDMI 14, or the HDMI port 22 receives the TMDS signal only containing the video signal output from the DVI source 50 through the DVI 56.

The audio port 38 receives the audio signal from the DVI source 50. The audio interface 58 of the DVI source 50 may be connected to the audio port 38 through an audio cable 54.

That is, when the HDMI source 10 is connected to the multimedia output apparatus 20 to output the video signal and the audio signal, the HDMI 14 of the HDMI source 10 is connected with the HDMI port 22 of the multimedia output apparatus 20 through the HDMI cable 12, so that both the video signal and the audio signal of a TMDS type are output to the multimedia output apparatus 20.

On the other hand, when the DVI source 50 is connected to the multimedia output apparatus 20 to output the video signal and the audio signal, the DVI 56 of the DVI source 50 is connected with the HDMI port 22 of the multimedia output apparatus 20 through a DVI-HDMI cable 52, so that the video signal of the TMDS type is output to the multimedia output apparatus 20. Additionally, the audio interface 58 of the DVI source 50 is connected to the audio port 38 of the multimedia output apparatus 20 through the audio cable 54, so that the audio signal is output to the multimedia output apparatus 20.

The decoder 26 decodes the TMDS signal received through the HDMI port 22. When the HDMI source 10 is connected to the HDMI port 22, both the video and audio signals are processed and output through the decoder 26. However, when the DVI source 50 is connected to the HDMI port 22, only the video signal is processed and output through the decoder 26.

The source sensor 28 receives data from the multimedia source through a display data channel (DDC) line, and reads bits to be able to distinguish the DVI source 50 from the HDMI source 10, thereby sensing the type of the multimedia source connected to the HDMI port 22. The source sensor 28 then inputs sensed source information to the CPU 30.

The switch 32 selects either the decoded audio signal received through the HDMI port 22 or the audio signal received through the audio port 38 according to a determination of the multimedia source made by the CPU 30. The selected audio signal is then input to the audio processor 36.

The video processor 34 receives the video signal from the decoder 26 and processes the video signal to be a suitable output format. The audio processor 36 processes the selected audio signal according to the switching operation performed by the switch 32.

When the CPU 30 determines that the HDMI source 10 is connected to the HDMI port 22 based on the sensed source information provided by the source sensor 28, the CPU 30 controls the switch 32 to transmit the audio signal from the HDMI IC 24 to the audio processor 36. The CPU 30 then controls the video processor 34 and the audio processor 36 to process the received video and audio signals, respectively.

On the other hand, when the CPU 30 determines that the DVI source 50 is connected to the HDMI port 22 based on the sensed source information provided by the source sensor 28, the CPU 30 controls the switch 32 to transmit the audio signal from the audio port 38 to the audio processor 36. The CPU 30 then controls the video processor 34 and the audio processor 36 to process the video signal from the HDMI IC 24 and the audio signal from the audio port 38, respectively.

That is, when the HDMI source 10 is connected to the multimedia output apparatus 20, the CPU 30 disconnects the audio port 38 from the audio processor 36 and controls the switch 32 to transmit the audio signal of the HDMI source 10 from the HDMI IC 24 to the audio processor 36. The audio processor 36 then processes the audio signal of the HDMI source 10. On the other hand, when the DVI source 50 is connected to the multimedia output apparatus 20, the CPU 30 disconnects an audio signal output line of the HDMI IC 24 from the audio processor 36, and controls the switch 32 to transmit the audio signal from the audio port 38 to the audio processor 36. The audio processor 36 then processes the audio signal of the DVI source 50.

Thus, the multimedia output apparatus 20 having the HDMI port 22 can output the audio signal of the DVI source 50 as well as the video signal.

As described above, the present general inventive concept provides a multimedia output apparatus and a multimedia system comprising an interface that is capable of receiving a video signal and an audio signal from both a first multimedia source that transmits a video signal and an audio signal individually through individual interfaces and a second multimedia source that transmits the video signal and the audio signal in a combination through the same interface.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multimedia output apparatus comprising:
   an audio port to receive a first audio signal;
   a connection port to respectively receive each of a first video signal without an accompanying audio signal, and both a second video signal and a second audio signal;
   a sensor to receive data from each of the first video signal and the second video signal, respectively, via a display data channel (DDC) line and to read bits of the data to sense whether the connection port receives only the first video signal or both the second video signal and the second audio signal;
   a switch to select one of the second audio signal received through the connection port and the first audio signal received through the audio port to be output; and
   a controller to control the switch to output the first audio signal received through the audio port when the sensor senses that only the first video signal is received through the connection port, and to output the second audio signal received through the connection port when the sensor senses that both the second video signal and the second audio signal are received through the connection port.

2. The multimedia output apparatus of claim 1, wherein the connection port comprises an HDMI port.

3. The multimedia output apparatus of claim 1, further comprising:
   a decoder to respectively decode each of the first video signal and both the second video signal and the second audio signal received through the connection port.

4. The multimedia output apparatus of claim 3, wherein the sensor receives one or more bits of the first video signal and the second video signal, respectively, from the decoder to determine a multimedia source of the first video signal or both the second video signal and the second audio signal.

5. The multimedia output apparatus of claim 4, wherein the one or more bits are data transmitted through a display data included in the first or second video signals.

6. The multimedia output apparatus of claim 1, wherein the source sensor determines a multimedia source type which outputs the first video signal and the second video and audio signals.

7. The multimedia output apparatus of claim 6, wherein the multimedia source type is one of a digital visual interface and a high definition multimedia interface.

8. A multimedia output apparatus, comprising:
   a connection port to receive a multimedia signal from each of a first multimedia source type and a second multimedia source type, respectively, the multimedia signal from the first multimedia source not including an audio signal;
   an audio port to receive an audio signal when the multimedia signal is from the first multimedia source type;
   a sensor to receive via a display data channel line one or more bits of the multimedia signal of each of the first source type and the second source type, respectively, received at the connection port and to distinguish between the at least first and second multimedia source types according to a characteristic of the one or more bits; and
   a controller to control an audio output by selecting the audio signal received at the audio port when the multimedia signal is from the first multimedia source type and an audio signal received at the connection port when the multimedia signal is from the second multimedia source type.

9. The multimedia output apparatus of claim 8, wherein the controller further comprises:
   a CPU to receive information sensed by the sensor and to make a determination of the multimedia source type.

10. The multimedia output apparatus of claim 9, wherein the controller further comprises:
    an audio processor to receive the selected audio signal and a video processor to receive a video signal received at the connection port.

11. The multimedia output apparatus of claim 10, wherein the controller further comprises:
    a switch to disconnect the audio port from the audio processor when the multimedia signal is determined to be from the second multimedia source type and to disconnect an audio signal connection from the connection port to the audio processor when the multimedia signal is determined to be from the first multimedia source type.

12. A multimedia system comprising:
    a first multimedia source having a first interface to transmit an audio signal and a video signal;
    a second multimedia source having a second interface to transmit the video signal without the audio signal and a third interface to transmit the audio signal; and
    a multimedia output apparatus comprising:
       a connection port to which each of the first and second interfaces is respectively connectable,
       an audio port to which the third interface is connectable,
       a switch to select one of the audio signal received through the connection port and the audio signal received through the audio port to be output,
       a source sensor to receive data from each of the first source and the second source, respectively, via a display data channel line and to read a plurality of bits of the data to sense whether the first multimedia source or the second multimedia source is connected to the connection port, and
       a controller to control the switch to output the audio signal received through the connection port when the source sensor senses that the first multimedia source is connected to the connection port and to output the audio signal received through the audio port when the sensor senses that the second multimedia source is connected to the connection port.

13. The multimedia system of claim 12, wherein the first interface comprises an HDMI interface and the second interface comprises a DVI interface.

14. A method of a multimedia output apparatus, the method comprising:

receiving a multimedia signal having at least a visual signal at a connection port;

reading bits of data from the multimedia signal via a display data channel line to determine whether both the visual signal and an audio signal are present in the multimedia signal;

if both the visual and the audio signal are present in the multimedia signal, outputting both the visual and the audio signal from the connection port using a switch; and if only the visual signal is present in the multimedia signal without the audio signal, outputting the visual signal from the connection port and outputting an audio signal received at an audio port using the switch.

15. The method of claim 14, wherein determining whether both the visual signal and the audio signal are present in the multimedia signal comprises reading one or more bits of the multimedia signal.

16. The method of claim 15, wherein determining whether both the visual signal and an audio signal are present in the multimedia signal further comprises determining a multimedia source type.

17. The method of claim 16, wherein the multimedia source is type is one of a digital visual interface and a high definition multimedia interface.

* * * * *